(12) United States Patent
Sherman et al.

(10) Patent No.: US 12,453,659 B2
(45) Date of Patent: Oct. 28, 2025

(54) FLUID-MANAGING MEDICAL ADHESIVE ARTICLES WITH MICROSTRUCTURED SURFACES

(71) Applicant: Solventum Intellectual Properties Company, Maplewood, MN (US)

(72) Inventors: Audrey A. Sherman, Woodbury, MN (US); Bret W. Ludwig, Oakdale, MN (US); Rajan B. Bodkhe, Woodbury, MN (US); Guy M. Kallman, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 891 days.

(21) Appl. No.: 17/629,817

(22) PCT Filed: Jul. 20, 2020

(86) PCT No.: PCT/IB2020/056797
§ 371 (c)(1),
(2) Date: Jan. 25, 2022

(87) PCT Pub. No.: WO2021/014333
PCT Pub. Date: Jan. 28, 2021

(65) Prior Publication Data
US 2022/0257424 A1 Aug. 18, 2022

Related U.S. Application Data

(60) Provisional application No. 62/878,495, filed on Jul. 25, 2019.

(51) Int. Cl.
A61F 13/0246 (2024.01)
A61F 13/02 (2024.01)

(52) U.S. Cl.
CPC ...... *A61F 13/0256* (2013.01); *A61F 13/0253* (2013.01); *A61F 13/0266* (2013.01)

(58) Field of Classification Search
None
See application file for complete search history.

(56) References Cited

U.S. PATENT DOCUMENTS

| | | |
|---|---|---|
| 4,693,935 A | 9/1987 | Mazurek |
| 4,737,559 A | 4/1988 | Kellen et al. |
| 5,088,483 A | 2/1992 | Heinecke |
| 5,160,315 A | 11/1992 | Heinecke et al. |
| 5,214,119 A | 5/1993 | Leir et al. |
| 5,461,134 A | 10/1995 | Leir et al. |
| 5,506,279 A | 4/1996 | Babu et al. |
| 5,512,650 A | 4/1996 | Leir et al. |
| 5,514,730 A | 5/1996 | Mazurek |
| 5,728,446 A | 3/1998 | Johnston et al. |
| 5,897,930 A | 4/1999 | Calhoun et al. |
| 6,083,856 A | 7/2000 | Joseph et al. |
| 6,630,554 B1 | 10/2003 | Hamada |
| 6,734,256 B1 | 5/2004 | Everaerts |
| 6,759,110 B1 | 7/2004 | Fleming |
| 6,806,320 B2 | 10/2004 | Everaerts |
| 6,858,110 B1 | 2/2005 | Himmelsbach |
| 6,984,114 B2 | 1/2006 | Zili |
| 7,084,209 B2 | 8/2006 | Everaerts |
| 7,153,924 B2 | 12/2006 | Kuepfer et al. |
| 7,255,920 B2 | 8/2007 | Everaerts |
| 7,781,639 B2 | 8/2010 | Johnston |
| 7,927,703 B2 | 4/2011 | Xia et al. |
| 9,738,818 B2 | 8/2017 | Sherman |
| 2003/0026945 A1 | 2/2003 | Lasko |
| 2007/0148475 A1 | 6/2007 | Sherman |
| 2011/0212325 A1 | 9/2011 | Determan |
| 2011/0300296 A1 | 12/2011 | Sherman |
| 2012/0123220 A1 | 5/2012 | Iyer |
| 2013/0060209 A1 | 3/2013 | Tyler |
| 2014/0323941 A1 | 10/2014 | Lee |

FOREIGN PATENT DOCUMENTS

| | | |
|---|---|---|
| EP | 0262786 | 10/1994 |
| GB | 2425487 | 11/2006 |
| GB | 2510665 | 7/2015 |
| JP | 11302617 | 11/1999 |
| JP | 11323072 | 11/1999 |
| JP | 3150309 | 4/2009 |
| WO | 1996008223 | 3/1996 |
| WO | 1996034028 | 10/1996 |
| WO | 1996034030 | 10/1996 |
| WO | 1996035458 | 11/1996 |
| WO | 1997040103 | 10/1997 |
| WO | 1998017726 | 4/1998 |
| WO | 1999066001 | 12/1999 |
| WO | 2000042958 | 7/2000 |
| WO | 2000068336 | 11/2000 |
| WO | 2004111151 | 12/2004 |
| WO | 2006003853 | 1/2006 |
| WO | 2010129299 | 11/2010 |
| WO | 2013066401 | 5/2013 |
| WO | 2013172883 | 11/2013 |

(Continued)

OTHER PUBLICATIONS

International Search Report for PCT International Application No. PCT/IB2020/056797, mailed on Oct. 21, 2020, 4 pages.

(Continued)

*Primary Examiner* — Robert T Butcher

(57) ABSTRACT

Adhesive constructions include a mammalian skin surface and an adhesive article in contact with the mammalian skin. The adhesive article includes a substrate and an adhesive layer. The adhesive layer in contact with the mammalian skin is a microstructured surface with channels. At least one channel extends to at least one boundary of the adhesive layer. The microstructured surface is a permanently microstructured surface, such that the channels in the surface of the adhesive layer permit transport of fluid.

13 Claims, 4 Drawing Sheets

(56) References Cited

FOREIGN PATENT DOCUMENTS

| | | |
|---|---|---|
| WO | 2014204803 | 12/2014 |
| WO | 2015130917 | 3/2015 |
| WO | 2018223090 | 12/2015 |
| WO | 2018125739 | 7/2018 |
| WO | 2018191327 | 10/2018 |
| WO | 2019193501 | 10/2019 |

OTHER PUBLICATIONS

Smith, "Modern Optical Engineering", The Design of Optical Systems, 1966, pp. 104-105.

FLUID-MANAGING MEDICAL ADHESIVE ARTICLES WITH MICROSTRUCTURED SURFACES

FIELD OF THE DISCLOSURE

The current disclosure relates to fluid-managing medical adhesive articles and methods for managing fluids by adhesive articles with microstructured surfaces.

BACKGROUND

A wide variety of medical articles and devices utilize adhesives to attach and hold the article or device to the skin. Many of these articles and devices are intended to remain adhered for extended periods of time. Current adhesive systems have difficulty remaining on the skin for extended periods of time because they suffer from moisture loading, that is to say from moisture trapped between the skin and the adhesive layer because the adhesive has inadequate moisture vapor transmission rate (MVTR) which results in "float off" of the system. MVTR is a measure of the passage of water vapor through a substance or barrier. Because perspiration naturally occurs on the skin, if the MVTR of a material or adhesive system is low, this can result in moisture accumulation between the skin and the adhesive that can cause the adhesive to "float off" or peel away and also can promote other detrimental effects such as bacterial growth and skin irritation. Therefore, much work has focused upon the development of adhesive systems that have a high MVTR.

SUMMARY

The current disclosure relates to fluid-managing medical adhesive articles and methods for managing fluids by adhesive articles with microstructured surfaces. In some embodiments, the method of providing fluid transport from an adhesive article attached to mammalian skin comprises providing an adhesive article and attaching the adhesive article to mammalian skin. The adhesive article comprises a substrate with a first major surface and a second major surface, and an adhesive layer with a first major surface and a second major surface, where the second major surface of the adhesive layer is in contact with the first major surface of the substrate. The first major surface of the adhesive layer comprises a microstructured surface comprising channels, with at least one channel that extends to at least one boundary of the adhesive layer. The adhesive layer comprises a pressure sensitive adhesive or a gel adhesive and the microstructured surface comprises a permanently microstructured surface, and the channels of the microstructured surface permits the transport of fluid.

This disclosure further relates to adhesive constructions. In some embodiments the adhesive construction comprises a surface comprising mammalian skin and an adhesive article in contact with the surface comprising mammalian skin. The adhesive article comprises a substrate with a first major surface and a second major surface, and an adhesive layer with a first major surface and a second major surface, where the second major surface of the adhesive layer is in contact with the first major surface of the substrate, and the first major surface of the adhesive layer comprises a microstructured surface comprising channels, with at least one channel that extends to at least one boundary of the adhesive layer. The microstructured surface comprises a permanently microstructured surface, such that the channels in the surface of the adhesive layer permit transport of fluid.

The disclosure also relates to multi-layer adhesive articles. In some embodiments, the multi-layer adhesive article comprises a release liner comprising at least one structured release surface, an adhesive layer with a first major surface and a second major surface, where the first major surface of the adhesive layer is in contact with the at least one structured release surface of the release liner, and a substrate with a first major surface and a second major surface, wherein the second major surface of the adhesive layer is in contact with the first major surface of the substrate. The substrate comprises a device, a sensor or a multi-layer substrate. The first major surface of the adhesive layer comprises a microstructured surface comprising channels, with at least one channel that extends to at least one boundary of the adhesive layer. The microstructured surface comprises a permanently microstructured surface, such that the channels in the surface of the adhesive layer permit transport of fluid.

BRIEF DESCRIPTION OF THE DRAWINGS

The present application may be more completely understood in consideration of the following detailed description of various embodiments of the disclosure in connection with the accompanying drawings.

Figure 1:
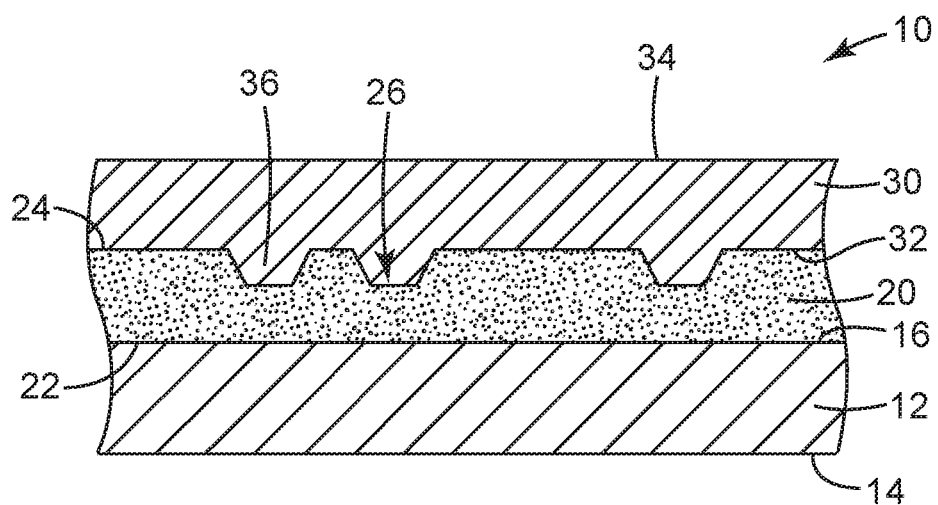
FIG. 1 is a cross sectional view of an embodiment of an article of the present disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide variety of medical articles and devices utilize adhesives to attach and hold the article or device to the skin. However, while adhesives and adhesive articles have shown themselves to be very useful for medical applications, there are also issues in the use of adhesives and adhesive articles. Medical adhesive-related skin injury (MARSI) has a significant negative impact on patient safety. Skin injury related to medical adhesive usage is a prevalent but under recognized complication that occurs across all care settings and among all age groups. In addition, treating skin damage is costly in terms of service provision, time, and additional treatments and supplies. Skin Injury occurs when the superficial layers of the skin are removed along with the medical adhesive product, which not only affects skin integrity but can cause pain and the risk of infection, increase wound size, and delay healing, all of which reduce patients' quality of life.

An example of a medical article is medical adhesive tape. Medical adhesive tape can be simply defined as a pressure-sensitive adhesive and a backing that acts as a carrier for the adhesive. The US Food and Drug Administration more specifically defines a medical adhesive tape or adhesive bandage as "a device intended for medical purposes that consists of a strip of fabric material or plastic, coated on one side with an adhesive, and may include a pad of surgical dressing without a disinfectant. The device is used to cover and protect wounds, to hold together the skin edges of a wound, to support an injured part of the body, or to secure objects to the skin."

While the pathophysiology of MARSI is only partially understood, skin injury results when the skin to adhesive attachment is stronger than skin cell to skin cell attachment. When adhesive strength exceeds the strength of skin cell to skin cell interactions, cohesive failure occurs within the skin cell layer. The intrinsic characteristics of all components of an adhesive product must then be taken into account to address these factors that may lead to MARSI. Properties of the adhesive to be considered include cohesiveness over time and the corresponding adhesion strength; properties of the tape/backing/dressing to be considered include breathability, stretch, conformability, flexibility, and strength.

Additionally, many of medical articles and devices are intended to remain adhered for extended periods of time. Current adhesive systems have difficulty remaining on the skin for extended periods of time because they suffer from moisture loading, that is to say, from moisture trapped between the skin and the adhesive layer because the adhesive has inadequate moisture vapor transmission rate (MVTR) which results in "float off" of the system. MVTR is a measure of the passage of water vapor through a substance or barrier. Because perspiration naturally occurs on the skin, if the MVTR of a material or adhesive system is low, this can result in moisture accumulation between the skin and the adhesive that can cause the adhesive to "float off" or peel away and also can promote other detrimental effects such as bacterial growth and skin irritation. Therefore, much work has focused upon the development of adhesive systems that have a high MVTR.

However, merely increasing the MVTR of an adhesive system has limitations in providing medical articles and devices that are designed to be adhered to skin. As articles and devices have become more complex and often contain many layers, often at least one of the layers of the article or device will not have a high MVTR and therefore the MVTR of the entire article or device is adversely impacted. For example, if a mechanical device such as a sensor is to be attached to the skin, the sensor generally has electronic and mechanical components that do not transmit water vapor, and therefore even having a high MVTR adhesive layer does not permit moisture to flow through the device and away from the skin. Similarly, even a relatively simple article can contain layers that have a low MVTR and thus the MVTR for the entire article is also low.

A feature of all the systems designed to manage fluid flow by MVTR is that they are z-direction flow systems. Using a standard coordinate system, the x-y plane is the surface of the article, with the z coordinate being the direction orthogonal to the x-y plane. For an article attached to skin, the z direction is the direction moving away from the x-y plane, and thus the route for fluid management is in the z direction. However, as mentioned above, the presence of a non-MVTR layer inhibits or blocks fluid flow in the z direction.

This is particularly true with wearable medical devices. As wearable medical devices have become more widespread for monitoring the health status of patients, methods for securing devices to mammalian skin for extended periods of time have become more and more important. The attachment systems for securing devices to mammalian skin can come into contact with fluids, such as bodily fluids, and therefore a technique for transporting these fluids away from the secured devices is desirable. As mentioned above, previous methods for transporting fluids involving MVTR are unsuitable for use with devices because the devices themselves generally do not have MVTR properties. Additionally, not only is an attachment system such as an adhesive system, with MVTR inadequate, an adhesive system with MVTR may be problematic for use with wearable devices. Since the devices in many cases incorporate electronic features, having moisture or other fluids pass through the securing means to contact the device is undesirable.

Therefore, improvements in MVTR may be ineffective for providing fluid management in adhesive medical articles designed to be attached to skin. Therefore, in this disclosure, methods and articles are described that include microstructured surfaces. Because the microstructures are in the surface of the adhesive layer, the microstructures permit fluid management in the x-y direction, rather than in the z direction. Disclosed herein are methods for providing fluid management from an adhesive article attached to mammalian skin. Also disclosed are multi-layer adhesive constructions that include mammalian skin and multi-layer adhesive articles in contact with the mammalian skin.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives and gel adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "gel adhesive" refers to a tacky semi-solid crosslinked matrix containing a liquid or a fluid that is capable of adhering to one or more substrates. The gel adhesives may have some properties in common with pressure sensitive adhesives, but they are not pressure sensitive adhesives.

The term "siloxane or siloxane-based" as used herein refers to polymers that contain units with dialkyl or diaryl siloxane ($-SiR_2O-$) repeating units. The siloxane-based polymers may be segmented copolymers or polysiloxane polymers. The terms silicone and siloxane are used interchangeably.

The term "hydrocarbon-based" as used herein refers to polymers that contain primarily hydrocarbon units.

The term "unsaturated" when referring to functional groups, refers to a carbon-carbon multiple bond, typically a carbon-carbon double bond. When an unsaturated double bond is a terminal group, it is generally referred to as an ethylenically unsaturated group, which has the general structure $-CH=CH_2$. Ethylenically unsaturated groups are also sometimes called "free radically polymerizable groups". Examples of unsaturated groups are vinyl groups and (meth) acrylate groups.

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups. The term "(meth)-acrylate-based" refers to materials that comprise primarily (meth)acrylates, at least 50% by weight (meth)acrylates.

The term "curing" as used herein refers to a polymerization reaction in which reactive groups, either present in a molecule or generated by an activation mechanism, react to form a higher molecular weight molecule. This reaction may or may not involve crosslinking. The term "crosslinking" refers to a reaction that forms a polymeric matrix, where all of the component elements of the matrix are linked together such that none of the components contained within the matrix are extractable. While in the polymer arts the terms "curing" and "crosslinking" are used interchangeably, it should be noted that not all curing reactions involve crosslinking.

As used herein the term "polymer" refers to a macromolecule that is a homopolymer or a copolymer. As used herein, the term "homopolymer" refers to a polymeric material that is the reaction product of one monomer, and the term "copolymer" refers to a polymeric material that is the reaction product of at least two different monomers.

As used herein, the term "microstructure" means the configuration of features wherein at least 2 dimensions of the features are microscopic. The topical and/or cross-sectional view of the features must be microscopic.

As used herein, the term "microscopic" refers to features of small enough dimension so as to require an optic aid to the naked eye when viewed from any plane of view to determine its shape. One criterion is found in *Modern Optic Engineering* by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

As used herein, the expressions "permanent microstructure" and "the microstructured pattern is a permanent feature of the adhesive surface" are used interchangeably and mean that the microstructures on the adhesive surface are designed not to disappear or collapse over time. Typically, microstructured adhesive surfaces are designed to remain only temporarily to permit air egress and then collapse and disappear.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl. Simple alkyl groups are abbreviated herein as methyl=Me, ethyl=Et, n-propyl=Pr.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl. The simple aryl group phenyl is abbreviated herein as Ph.

The term "alkoxy" refers to a monovalent group of formula $-OR^a$ where $R^a$ is an alkyl group. The term "aryloxy" refers to a monovalent group of formula $-OR^a$ where $R^a$ is an aryl group.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or $-NR-$ where R is alkyl. The heteroalkylene can be linear, branched, cyclic, substituted with alkyl groups, or combinations thereof. Some heteroalkylenes are poloxyyalkylenes where the heteroatom is oxygen such as for example,

$-CH_2CH_2(OCH_2CH_2)_nOCH_2CH_2-$.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aralkylene" refers to a divalent group of formula $-R^a-Ar^a-$ where $R^a$ is an alkylene and $Ar^a$ is an arylene (i.e., an alkylene is bonded to an arylene).

Disclosed herein are methods for providing fluid transport from an adhesive article attached to mammalian skin. The methods comprise providing an adhesive article comprising a microstructured surface with at least one channel, attaching the microstructured surface of the adhesive article to mammalian skin, where the at least one channel of the microstructured surface permits the transport of fluid. The combination of adhesive article and mammalian skin comprises an adhesive construction. The adhesive articles and adhesive constructions are described in greater detail below.

This disclosure includes a wide array of adhesive articles. The adhesive articles comprise a microstructured surface to permit fluid transport. Generally, the adhesive articles comprise a substrate with a first major surface and a second major surface, and an adhesive layer with a first major surface and a second major surface. The second major surface of the adhesive layer is in contact with the first major surface of the substrate, and the first major surface of the adhesive layer comprises a microstructured surface. The microstructured surface of the adhesive layer comprises channels with at least one channel that extends to at least one boundary of the adhesive layer.

The microstructured surface comprises a permanently microstructured surface, meaning that the microstructured pattern is a permanent feature of the adhesive surface. Being a permanent feature of the adhesive surface means that the microstructured pattern retains its shape indefinitely at the application and use temperature of the article. This permanent microstructured pattern is in contrast to typical microstructured surfaces of adhesive layers that are generally designed to be temporary. The permanent microstructured features form at least one channel that permits the management of fluids. This fluid management permits the egress of fluids in an x-y direction rather than in the z direction (i.e. through the adhesive layer by MVTR).

A wide variety of adhesives are suitable for use in the permanently microstructured adhesive layers. Typically, the adhesive layer comprises a pressure sensitive adhesive or a gel adhesive. Among the suitable pressure sensitive adhesives are (meth)acrylate pressure sensitive adhesives, siloxane pressure sensitive adhesives, and block copolymer pressure sensitive adhesives. The pressure sensitive adhesive may contain a single polymeric material or may contain a blend of polymeric materials. The pressure sensitive adhesive may be a crosslinked pressure sensitive adhesive. Examples of suitable gel adhesives are siloxane gel adhesives which comprise a crosslinked siloxane matrix and a fluid, typically a siloxane fluid. Each of these adhesives is described in detail below.

In some embodiments the adhesive is a (meth)acrylate-based pressure sensitive adhesive. Particularly suitable (meth)acrylate-based pressure sensitive adhesives include copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth) acrylate has an average of about 4 to about 20 carbon atoms, or an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. Typically, monomer B is a reinforcing (meth)acrylic monomer, including an acrylic acid, a methacrylic acid, an acrylamide, or a (meth) acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers that can be used as monomer B include acrylic acid and acrylamide. Combinations of various reinforcing monoethylenically unsaturated monomers categorized as a B monomer can be used to make the copolymer.

Generally, the (meth)acrylate copolymer is formulated to have a resultant Tg of less than about 0° C. and more typically, less than about −10° C. Such (meth)acrylate copolymers generally include about 60 parts to about 98 parts per hundred of at least one monomer A and about 2 parts to about 40 parts per hundred of at least one monomer B. In some embodiments, the (meth)acrylate copolymers have about 85 parts to about 98 parts per hundred or at least one monomer A and about 2 parts to about 15 parts of at least one monomer B.

In other embodiments, the adhesive comprises a siloxane pressure sensitive adhesive. A wide variety of siloxane pressure sensitive adhesives are suitable, and typically are referred to as siloxane-based, as the pressure sensitive adhesives may contain additional groups besides siloxane units. The siloxane-based pressure sensitive adhesive compositions comprise at least one siloxane-based elastomeric polymer and typically include tackifying resins. Examples of suitable siloxane-based elastomeric polymers include for example, urea-containing siloxane copolymers, oxamide-containing siloxane copolymers, amide-containing siloxane copolymers, urethane-containing siloxane copolymers, and mixtures thereof. Siloxane-based pressure sensitive adhesives are different from the siloxane gel adhesives described below since pressure sensitive adhesives and gel adhesives are different classes of materials.

One example of a useful class of siloxane elastomeric copolymers is urea-containing silicone polymers such as silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit:

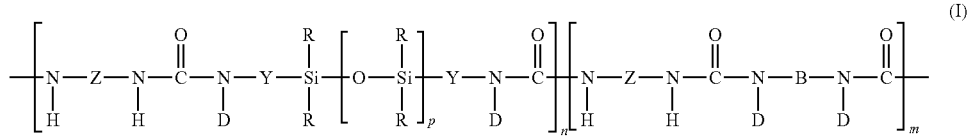

wherein
  each R is a moiety that, independently, is an alkyl moiety, having about 1 to 12 carbon atoms, or an aryl moiety having from about 6 to 20 carbon atoms. Typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;
  each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;
  each Y is a polyvalent radical that independently is an alkylene radical of 1 to 10 carbon atoms, an aralkylene radical or an arylene radical having 6 to 20 carbon atoms;
  each D is selected from the group consisting of hydrogen, an alkyl radical of 1 to 10 carbon atoms, phenyl, and a radical that completes a ring structure including B or Y to form a heterocycle;
  where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;
  m is a number that is 0 to about 1000;
  n is a number that is at least 1; and
  p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of silicone elastomeric polymers are oxamide-containing polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula II.

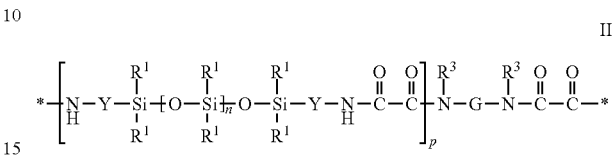

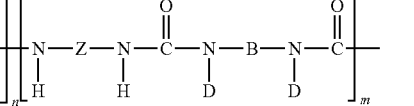

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN-G-NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula II.

Suitable alkyl groups for $R^1$ in Formula II typically have 1 to 10, 1 to 6, or 1 to 4 carbon atoms. Exemplary alkyl groups include, but are not limited to, methyl, ethyl, isopropyl, n-propyl, n-butyl, and iso-butyl. Generally, at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II is a residual unit that is equal to a diamine compound of formula $R^3HN-G-NHR^3$ minus the two amino groups (i.e., $-NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Another useful class of silicone elastomeric polymers is amide-based silicone polymers. Such polymers are similar to the urea-based polymers, containing amide linkages (—N(D)-C(O)—) instead of urea linkages (—N(D)-C(O)—N(D)-), where C(O) represents a carbonyl group and D is a hydrogen or alkyl group.

Such polymers may be prepared in a variety of different ways. Starting from the polydiorganosiloxane diamine described above in Formula II, the amide-based polymer can be prepared by reaction with a poly-carboxylic acid or a poly-carboxylic acid derivative such as for example diesters. In some embodiments, an amide-based silicone elastomer is prepared by the reaction of a polydiorganosiloxane diamine and di-methyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) bonds) and an ethylenically unsaturated ester. For example a silicone di-hydride can be reacted with an ethylenically unsaturated ester such as, for example, $CH_2=CH-(CH_2)_n-C(O)-OR$, where C(O) represents a carbonyl group and n is an integer up to 15, and R is an alkyl, aryl or substituted aryl group, to yield a silicone chain capped with $-Si-(CH_2)_{n+2}-C(O)-OR$. The $-C(O)-OR$ group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc).

Another useful class of silicone elastomeric polymers is urethane-containing silicone polymers such as silicone poly-urea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula I except that the —N(D)-B—N(D)- links are replaced by —O—B—O— links. Examples are such polymers are presented, for example, in U.S. Pat. No. 5,214,119.

These urethane-containing silicone polymers are prepared in the same fashion as the urea-based silicone polymers except that an organic polyol is substituted for an organic polyamine. Typically, since the reaction between a alcohol group and an isocyanate group is slower than the reaction between a amine group and an isocyanate group, a catalyst such as a tin catalyst commonly used in polyurethane chemistry, is used.

The siloxane block copolymer adhesives typically include a siloxane tackifying resin. Siloxane tackifying resins have in the past been referred to as "silicate" tackifying resins, but that nomenclature has been replaced with the term "siloxane tackifying resin". The siloxane tackifying resins are added in sufficient quantity to achieve the desired tackiness and level of adhesion. In some embodiments, a plurality of siloxane tackifying resins can be used to achieve desired performance.

Suitable siloxane tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary siloxane resins include MQ siloxane tackifying resins, MQD siloxane tackifying resins, and MQT siloxane tackifying resins. These siloxane tackifying resins usually have a number average molecular weight in the range of 100 to 50,000-gm/mole, e.g., 500 to 15,000 gm/mole and generally R' groups are methyl groups.

MQ siloxane tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the siloxane tackifying resin.

Suitable siloxane tackifying resins are commercially available from sources such as Dow Corning (e.g., DC 2-7066), Momentive Performance Materials (e.g., SR545 and SR1000), and Wacker Chemie AG (e.g., BELSIL TMS-803).

In other embodiments, the adhesive comprises a block copolymer pressure sensitive adhesive that are not siloxane-based like the polymers described above. Examples of suitable block copolymers comprise polyurethane block copolymers, polyurea block copolymers, or hydrocarbon block copolymers.

Examples of suitable polyurethane block copolymers and polyurea block copolymers include the non-siloxane polymers described in U.S. Pat. No. 9,738,818.

In some embodiments, the non-siloxane polyurea-based polymer or non-siloxane polyurethane-based polymer comprises a segmented copolymer, which copolymer comprises repeating units of Formula III:

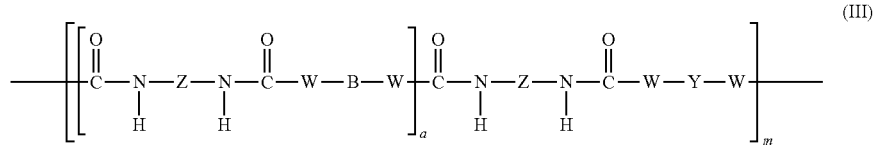

where each W is N-D or O; each B is independently a polyvalent radical; each D is independently selected from the group consisting of hydrogen, an alkyl group, a cycloalkyl group, a phenyl group, a group that completes a ring structure that includes B to form a heterocycle, and mixtures thereof; each Z is independently a polyvalent radical; each Y is independently a polyoxyalkylene; m is an integer greater than zero; and a is zero or an integer greater than zero.

Another suitable class of block copolymer pressure sensitive adhesives is hydrocarbon-based block copolymer pressure sensitive adhesives. Examples of suitable hydrocarbon-based block copolymer pressure sensitive adhesives are styrene block copolymer pressure sensitive adhesives and (meth)acrylate block copolymer pressure sensitive adhesives.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from KRATON Corp., and "EUROPRENE SOL TE 9110", available from EniChem Elastomers Americas, Inc.; linear styrene-(ethylene-butylene) block copolymers such as "KRATON G1657", available from KRATON Corp.; linear styrene-(ethylene-propylene) block copolymers such as "KRATON G1750X", available from KRATON Corp.; and linear, radial, and star styrene-butadiene block copolymers such as "KRATON D1118X", available from KRATON Corp., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures.

Also suitable are (meth)acrylate-based block copolymer pressure sensitive adhesives. The (meth)acrylate-based block pressure sensitive adhesives include copolymers that are the reaction product of at least two A block polymeric units and at least one B block polymeric unit (i.e., at least two A block polymeric units are covalently bonded to at least one B block polymeric unit). Each A block, which has a Tg of at least 50° C., is the reaction product of a first monomer composition that contains an alkyl methacrylate, an aralkyl methacrylate, an aryl methacrylate, or a combination thereof. The B block, which has a Tg no greater than 20° C., is the reaction product of a second monomer composition that contains an alkyl(meth)acrylate, a heteroalkyl(meth)acrylate, a vinyl ester, or a combination thereof. The block copolymer contains 20 to 50 weight percent A block and 50 to 80 weight percent B block based on the weight of the block copolymer.

Methods of preparing block copolymers using living anionic polymerization methods are further described, for example, in U.S. Pat. No. 6,734,256 (Everaerts et al), U.S. Pat. No. 7,084,209 (Everaerts et al), U.S. Pat. No. 6,806,320 (Everaerts et al), and U.S. Pat. No. 7,255,920 (Everaerts et al.). This polymerization method is further described, for example, in U.S. Pat. No. 6,630,554 (Hamada et al.) and U.S. Pat. No. 6,984,114 (Kato et al.) as well as in Japanese Patent Application Kokai Publication Nos. Hei 11-302617 (Uchiumi et al.) and 11-323072 (Uchiumi et al.). Suitable block copolymers can be purchased from Kuraray Co., LTD. (Tokyo, Japan) under the trade designations LA POLYMER or KURARITY. Some of these block copolymers such as LA2140E, LA2250, LA2330, and LA410L are triblock copolymers with poly(methyl methacrylate) endblocks and a poly(n-butyl acrylate) midblock.

In some embodiments, the adhesive layer comprises a crosslinked pressure sensitive adhesive layer or a gel adhesive. Because the microstructured layer is a permanent microstructured layer, in some embodiments the adhesive layer comprises a crosslinked pressure sensitive adhesive layer. The crosslinked pressure sensitive adhesive layer may contain a single polymeric material or may contain a blend of polymeric materials. The crosslinked pressure sensitive adhesive layer can contain ionic crosslinks, covalent crosslinks, or a combination thereof. By ionic crosslinks, it is meant that the pressure sensitive adhesive comprises a polymeric blend of at least two polymers containing complimentary ionic groups that form an ionic interaction, as is explained below. Typically, ionically crosslinked pressure sensitive adhesive compositions include at least one polymer with either an acid or base functionality that is a pressure sensitive adhesive polymer, and a high Tg polymer with an acid or base functionality, where the functionality on the pressure sensitive adhesive polymer and the high Tg polymer cause an acid-base interaction that forms a compatibilized blend. By the term "pressure sensitive adhesive polymer" it is meant that the polymer by itself can be used as a pressure sensitive adhesive, but the term does not exclude blends of polymers or one or more polymers with additives such as tackifying agents or plasticizing agents. By covalent crosslinks, it is meant that covalent chemical bonds are present between polymers to form a polymeric matrix.

Particularly suitable crosslinked pressure sensitive adhesives are (meth)acrylate-based pressure sensitive adhesives. In general, two general classes of crosslinked (meth)acrylate-based pressure sensitive adhesives are useful, those that include covalent crosslinks and those that include ionic crosslinks and may also have covalent crosslinks. Each of these general classes is described below.

Particularly suitable covalently crosslinked (meth)acrylate-based pressure sensitive adhesives include copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc. Suitable examples of Monomer A and Monomer B are described above.

A crosslinking agent is used to build the molecular weight and the strength of the (meth)acrylate copolymer. Generally, the crosslinking agent is one that is copolymerized with monomers A and B. Suitable crosslinking agents are disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of about 250 nanometers to about 400 nanometers), causes the copolymer to crosslink.

The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, the crosslinking agent is used in an amount of about 0.1 part to about 10 parts, based on the total amount of monomers.

One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

Another useful class of crosslinking agents contain functionality which is reactive with carboxylic acid groups on the acrylic copolymer when a carboxylic acid group is present. Examples of such crosslinkers include multifunctional aziridine, isocyanate, epoxy, and carbodiimide compounds. Examples of aziridine-type crosslinkers include, for example 1,4-bis(ethyleneiminocarbonylamino)benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), commonly referred to as "Bisamide" is particularly useful. Common polyfunctional isocyanate crosslinkers include, for example, trimethylolpropane toluene diisocyanate, tolylene diisocyanate, and hexamethylene diisocyanate.

Examples of crosslinked (meth)acrylate pressure sensitive adhesive layers that are ionically crosslinked are those that are blends of polymeric materials. Particularly suitable are adhesive compositions comprising at least one copolymer prepared from a mixture of at least one alkyl (meth)acrylate monomer, and at least one free radically polymerizable monomer comprising acid or base functionality, and a high Tg polymer with a glass transition temperature of greater than 20° C. and a number average molecular weight of greater than about 100,000 Daltons, where the high Tg polymer is a (meth)acrylate copolymer comprising at least one free radically polymerizable monomer comprising acid or base functionality, and a crosslinker, where the functionality of the pressure sensitive adhesive component and the high Tg polymer from an acid-base interaction when mixed. Such adhesive compositions are described in U.S. Pat. No. 7,927,703 (Xia et al.).

In some embodiments, the adhesive layer comprises a gel adhesive composition. Gel adhesives comprise a crosslinked polymeric siloxane matrix and a fluid, typically a siloxane fluid. A wide variety of crosslinked polymeric siloxane matrices are suitable for use in the gel adhesive compositions. The matrices can be prepared in a variety of ways. The crosslinked polymeric siloxane matrix can be prepared by thermal curing, condensation curing, radiation curing, or a combination thereof.

Examples of thermal curing include peroxide curing and hydrosilylation. In peroxide curing, a peroxide initiator is added to an uncrosslinked siloxane composition. Upon heating, the peroxide decomposes to form radicals which react with siloxane to form polymeric radicals. The polymeric radicals combine to form crosslinks. A wide variety of peroxides have been found to be suitable, such as di-acyl peroxides and peroxy esters. If the siloxane contains vinyl groups, the crosslinking reaction is generally much more facile and a class of peroxides called "vinyl specific peroxides" can be used to crosslink these materials. Examples of vinyl specific peroxides include di-aralkyl peroxides. alkyl-aralkyl peroxides, and di-alkyl peroxides. Thus, peroxide curing can be achieved either with non-functional siloxane materials or vinyl-functional siloxane materials.

Hydrosilylation, also called catalytic hydrosilation, describes the addition of Si—H bonds across unsaturated bonds. When hydrosilylation is used for curing, typically both the Si—H and unsaturated bonds are present on siloxane molecules, either the same molecule or on different molecules. The hydrosilylation reaction is typically catalyzed by a platinum catalyst, and generally heat is applied to effect the curing reaction. In this reaction, the Si—H adds across the double bond to form new C—H and Si—C bonds. This process in described, for example, in PCT Publication No. WO 2000/068336 (Ko et al.), and PCT Publication Nos. WO 2004/111151 and WO 2006/003853 (Nakamura).

Another method of curing is condensation curing. Two related reaction types are included as condensation reactions. The first is the condensation reaction itself, the second is moisture curing, which is a 2-step condensation curing reaction. The difference between these two condensation reactions is the starting materials used. In the condensation reaction silanol groups (—SiOH) are present in the reactants, whereas in the moisture curing reaction, the reactive groups are precursor groups that react with water to form silanol groups. These formed silanol groups then undergo the condensation reaction.

Condensation reactions involve the reaction of two silanol groups to form a —Si—O—Si— linkage and a molecule of water. As mentioned above, if the reactants contain silanol groups, this condensation reaction procedes to form the cured matrix. In the moisture curing reaction, the reactants are precursors to silanols, typically alkoxy or aryloxy silanes (—SiOR). These precursor groups react with water to form silanol groups and a molecule of alcohol. The formed silanol groups then react by condensation to form a —Si—O—Si— linkage. This sequence is summarized in Reaction Scheme 1 below:

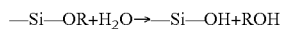

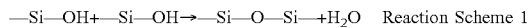   Reaction Scheme 1

In this reaction scheme, the first step is the reaction of the precursor with water to form silanol groups, and the second step is the condensation reaction. Typically, the moisture curing reaction is facilitated by a catalyst. Examples of suitable curing catalysts for this moisture curing reaction include alkyl tin derivatives (e.g., dibutyltindilaurate, dibutyltindiacetate, and dibutyltindioctoate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). Other catalysts useful for the moisture curing reaction include acids, anhydrides, and lower alkyl ammonium salts thereof which include but are not limited to those selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

A particularly suitable curing mechanism for forming the crosslinked polymeric matrix of this disclosure is radiation curing. A variety of radiation sources are suitable, especially UV (ultraviolet), E-beam (electron beam), and gamma ray radiation. An advantage of E-beam and gamma ray radiation is that non-functional siloxane materials are curable in this way and no initiators or catalysts are required. Additionally, the level of crosslinking desired can be controlled by controlling the level of E-beam or gamma ray radiation used. E-beam or gamma ray radiation can also be used to form crosslinks in a non-crosslinked siloxane polymer layer. For example, a di-functional silanol material could be cured to form a polymeric layer containing high molecular weight linear polymers, and this layer could then be exposed to E-beam or gamma ray radiation to crosslink the high molecular weight linear polymers to form a crosslinked matrix.

UV curing is another type of curing that uses free radical polymerization. If UV curing is used, typically a UV sensitive free radical initiator is present in the curable composition, and free radically polymerizable groups are present on the reactants. UV radiation is used to activate the free radical initiator which forms free radicals that initiate the curing reaction. Typically, the free radically polymerizable groups are ethylenically unsaturated. Examples of suitable ethylenically unsaturated siloxanes include (meth)acrylate functional siloxanes and/or vinyl-functional or allyl-functional siloxanes. (Meth)acrylate-functional siloxanes can be prepared by, for example, the reaction of amine-functional siloxanes with isocyanate-functional (meth)acrylates. In some embodiments, the ethylenically unsaturated siloxanes are co-polymerized with additional free radically polymerized monomers. The free radical polymerization can be carried out under a variety of conditions using a variety of different types of free radical initiators. Photoinitiators have been found to be particularly suitable as described in U.S. Pat. No. 5,514,730 (Mazurek).

As was described above, a wide range of curing reactions can be used to produce the crosslinked siloxane matrix of the gel adhesive compositions of this disclosure. Particularly suitable is the technique described, for example, in US Patent Publication No. 2011/0212325 (Determan et al.) in which non-functionalized polysiloxane fluids are crosslinked by exposure to E-beam radiation to form a polysiloxane matrix with the unpolymerized polysiloxane fluid forming the fluid component of the gel adhesive.

As with the siloxane pressure sensitive adhesives described above, the siloxane gel adhesives can include siloxane tackifying resin. Siloxane tackifying resins are described above.

The adhesive layer may further comprise a wide variety of optional additives as long as the additives do not interfere with the function of the adhesive layer. Examples of suitable optional include tackifying resins, plasticizers, anti-oxidants, fillers, leveling agents, ultraviolet light absorbers, hindered amine light stabilizers (HALS), oxygen inhibitors, wetting agents, rheology modifiers, defoamers, biocides, dyes, pigments, and the like. In some embodiments, the adhesive layer further comprises an additive selected from tackifiers, plasticizers, fillers, antimicrobials, or combinations thereof.

The permanent microstructures can be imparted to the adhesive layer in a variety of different ways. Typically, an adhesive composition is applied to a microstructured surface to form a microstructured adhesive layer. The adhesive composition may be an adhesive that is dispersed in a solvent, is a molten composition, or is a curable composition. A substrate can be contacted to this microstructured adhesive layer to form an adhesive article. Another method for imparting the microstructured adhesive layer is contact the adhesive composition to the substrate surface to form an adhesive layer and then contacting this adhesive layer to a microstructured surface. Each method has advantages and disadvantages. In the case of crosslinked microstructured adhesive layers, typically it is desirable to effect crosslinking of the adhesive while in contact with the microstructured surface such that the adhesive is crosslinked in the microstructured state.

The adhesive composition can be applied to a microstructured surface, such as a microstructured release liner or microstructured tool, by any conventional application method, including, but not limited to, extrusion coating, gravure coating, curtain coating, slot coating, spin coating, screen coating, transfer coating, brush or roller coating, and the like. The adhesive composition can be applied to the microstructured surface as a hot melt composition, a solvent-borne composition or a 100% solids composition. The adhesive layer coating can be further processed to produce the adhesive layer. The processing can include drying of the adhesive layer coating if solvent-borne, cooling of the adhesive layer coating if hot melt coated, or crosslinking of the adhesive layer. Crosslinking, if desired, can be effected by the application of heat or radiation or a combination thereof. The thickness of a coated adhesive layer, typically in the form of a liquid is in part dependent on the nature of the materials used and the specific properties desired, but those properties and the relationship of thickness to the properties is well understood in the art. Exemplary thicknesses of an adhesive layer may be in the range from about 0.05 to about 100 micrometers.

Typically, a microstructured release liner is used to impart the microstructured pattern in the adhesive layer, since release liners remain with the adhesive layer during shipment and processing and is only removed when the adhesive article is to be used. In this way, the adhesive layer is protected until the article is to be used. A wide range of microstructured release liners are suitable. Typically, the microstructured release liners are prepared by embossing. This means that the release liner has an embossable surface which is contacted to a structured tool with the application of pressure and/or heat to form an embossed surface. This embossed surface is a structured surface. The structure on the embossed surface is the inverse of the structure on the tool surface, that is to say a protrusion on the tool surface will form a depression on the embossed surface, and a depression on the tool surface will form a protrusion on the embossed surface.

A wide variety of patterns and shapes can be present in the surface of the microstructured surface of the release liner. The shape or pattern of the structures does not matter if the pattern is pre-embossed into the release liner surface prior to contacting the adhesive layer or if the structure is imparted to the release liner surface by embossing through the release liner when the release liner is in contact with the adhesive layer. The structures may have a wide variety of shapes and sizes. In general, the structures are microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

A new class of microstructured release liners have been produced that have a randomized pattern of microchannels. These release liners, having a series of randomized, yet controlled protrusions so as to form a series of randomized, yet controlled microchannels in an adhesive layer disposed on the release liners. These release liners, and adhesive articles made with them is discussed in U.S. Patent Ser. No. 62/652,567 filed on Apr. 4, 2018 with the title "Chaotic Non-continuous Structures Useful For Functional Adhesive Systems". Adhesive articles with chaotic non-continuous microchannel surfaces are described in greater detail below.

A wide variety of substrates are suitable for the articles of this disclosure. In many embodiments, the substrate comprises a substrate suitable for use in a medical article. Examples of suitable substrates include a backing comprising: a polymeric film, a fabric, a non-woven, a foam, a paper, or a mesh; a release liner; or a device.

Generally, when the substrate is a backing, the backing is conformable to anatomical surfaces. As such, when the backing is applied to an anatomical surface, it conforms to the surface even when the surface is moved. Generally, the backing is also conformable to animal anatomical joints. When the joint is flexed and then returned to its unflexed position, the backing stretches to accommodate the flexion of the joint, but it is resilient enough to continue to conform to the joint when the joint is returned to its unflexed condition.

Examples of particularly suitable backings can be found in U.S. Pat. Nos. 5,088,483 and 5,160,315, and include polyester, polyurethane, polyolefin, poly(meth)acrylate, or combinations thereof. These films have a combination of desirable properties including resiliency.

In some embodiments, the backing substrate can be physically modified to make the backing more flexible or conformable. This physical modification can involve modifying the backing material with openings, slits, cuts, or other perforations, and the modifications can take a wide range of shapes and sizes. The modification can reduce the rigidity and increase the elasticity of the backing to make it more conformable to an anatomical surface even when the surface is moved. Examples of such modified backing materials in medical articles are described in PCT Publication WO 2018/125739.

In other embodiments, the substrate comprises a release liner. These embodiments are particularly suitable as a precursor to other medical articles. In these embodiments, the release liner can be removed to expose the adhesive surface. A wide range of substrates, including the backings described above and the medical devices described below can then be attached to the adhesive layer.

A wide variety of release liners are suitable. Release liners are commonly used and well understood in the adhesive arts. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

Particularly suitable substrates are medical devices. A wide range of medical devices are suitable. Many suitable devices are known as WHD or wearable health devices. These devices include a wide range of monitoring devices to sense blood pressure, heart rate, respiration, blood oxygen saturation, blood glucose, body temperature, motion evaluation, and the like. As was mentioned above, frequently these devices are meant to be worn for extended periods and thus it is desirable that the device be secured with an attachment system that is capable of transporting fluids away from the device in the x-y direction rather than by MVT.

In some embodiments, the second surface of the substrate comprises protrusions. These protrusions can function as mechanical features to aid the attachment of additional substrates or articles. In this way, substrates or articles can be attached from the surface with protrusions on it by mechanical interlocking, in a detachable way. Thus, for example, one could attach the adhesive article of this disclosure to the skin of a subject, and then attach a sensor to adhesive article by mechanical means. This sensor can later be removed and replaced by either another sensor or different substrate or article without removing the adhesive article from the subject.

In other embodiments, the second surface of the substrate may have an adhesive layer disposed on it. In these embodiments, the attachment of additional substrates or articles can be attached to substrate by adhesive attachment, like the mechanical attachment described above. In this instance, the attachment is adhesive attachment instead of mechanical attachment. The adhesive layer on the second surface of the substrate may be covered by a release liner to protect the adhesive layer until it is desired to attach a substrate or article to it. In some embodiments, the additional substrates or articles may include tubing which is adhered to the adhesive layer on the second surface of the substrate.

A wide range of fluids can be transported by the articles of this disclosure. Examples of suitable fluids include vapors and aqueous fluids. A wide variety of aqueous fluids can be transported by the articles of this disclosure. Aqueous fluids are those that contain water, typically primarily comprise water, and can also contain other water-miscible fluids and can have one or more solutes dissolved in them. As the articles of the present disclosure may be attached to mammalian skin for extended periods of time, the articles are likely to come into contact with a wide range of aqueous fluids. Among these aqueous fluids include a wide range of cleaning fluids, as the area adjacent to the location of the attached article is washed or cleansed, by washing, showering, shampooing, and the like. A particularly important class of aqueous fluids is biological fluids. Examples of biological fluids include blood, sweat, and wound exudate.

Typically, the fluid transport by the articles of this disclosure is passive fluid transport. By "passive fluid transport" it is meant that the microstructured features of the present articles transport fluids without the need to assist the fluid transport. However, in some embodiments it may be desirable to use assisted fluid transport with the articles of this disclosure. Examples of methods that can be used to assist fluid transport includes the application of a vacuum or the use of a wicking material layer. Vacuum can be applied continuously or intermittently to the articles. Examples of wicking material layers include gauze, sponges and the like. Wicking material layers can be placed adjacent to the fluid transport channels or articles of this disclosure to aid the transport of fluid from the channels.

Also disclosed are adhesive constructions that comprise a surface comprising mammalian skin, and an adhesive article in contact with the surface comprising mammalian skin. Mammalian skin is well understood in the art as the skin of the mammal, frequently a human being to which the adhesive article is attached. In some embodiments, the mammalian skin is treated prior to attachment by shaving, clipping, washing or the like, while in other embodiments the article is attached without preparation.

Typically, the adhesive article in the adhesive construction comprises a substrate with a first major surface and a second major surface and an adhesive layer with a first major surface and a second major surface, where the second major surface of the adhesive layer is in contact with the first major surface of the substrate, and where the first major surface of the adhesive layer comprises a microstructured surface. The microstructure surface comprises channels with at least one channel that extends to at least one boundary of the adhesive layer. The microstructured surface comprises a permanently microstructured surface, such that the channels in the surface of the pressure sensitive adhesive layer permit transport of fluid. A wide range of adhesive articles suitable in the adhesive constructions are described in detail above.

In some embodiments, the adhesive construction may further comprise an article located between the adhesive article and the surface comprising mammalian skin. Examples of suitable articles include tubing, sensors, drug delivery devices and the like. In these embodiments, the adhesive articles of this disclosure are used as a tape to hold the articles in contact with the skin.

Also disclosed herein are multi-layer adhesive articles suitable as precursors in the formation of the adhesive constructions described above. The multi-layer adhesive articles comprise at least a release liner with at least one structured surface, an adhesive layer, and a substrate. The multi-layered articles include the articles described above as well as articles where the substrate comprises a multi-layer substrate. The adhesive layer has a first major surface and a second major surface, where the first major surface of the adhesive layer is in contact with the at least one structured release surface of the release liner, and the second major surface of the adhesive layer is in contact with the substrate. The substrate has a first major surface and a second major surface, where the adhesive layer is contact with the first major surface of the substrate. The substrate can be a single layer substrate or a multi-layer substrate. A wide variety of substrates are suitable for the articles of this disclosure. In many embodiments, the substrate comprises a substrate suitable for use in a medical article. Examples of suitable substrates include a backing comprising: a polymeric film, a fabric, a non-woven, a foam, a paper, or a mesh; a release liner; or a device. Each of these substrates has been described above. In some embodiments, the substrate is a multi-layer substrate that can include combinations of these elements. For example, the substrate may comprise a backing layer with a first major surface and a second major surface where the first major surface of the backing layer is in contact with the adhesive layer. As described above, the second major surface of the backing layer may be a surface with protrusions on its surface to permit mechanical interactions with additional substrates or articles, or the second major surface of the backing may be in contact with a second adhesive layer. The second adhesive layer may be the same as the adhesive layer of the article or it may be different. In some embodiments, the second adhesive layer is covered by a release liner. As described above, the adhesive article can be attached to mammalian skin, and a sensor, device, or other medical article can be attached to the protrusions on the surface of the substrate. If the second surface has an adhesive layer disposed on it which is covered by a release liner, the release liner can be removed from the second adhesive layer, and a sensor, device, or other medical article can be attached. In this way the wearable device can be assembled as needed rather than requiring that the entire wearable article be pre-manufactured. Thus, the multi-layer adhesive article can be supplied separately and assembled as needed. For example, if it desired to attach a sensor to a patient, one need not have a pre-made wearable sensor article, rather one could have a multi-layer adhesive article of this disclosure and a separate sensor. The multi-layer adhesive article of this disclosure could be attached to the patient, the release liner removed from the second adhesive layer and the sensor attached to the second adhesive layer. In this way, a wide range of sensors can be used with the multi-layer adhesive article of this disclosure. Rather than having to make a wide array of adhesive articles with each type of sensor, one can use a single type of multi-layer adhesive article of this disclosure with a wide array of different sensors.

The articles, constructions and methods of this disclosure can be more fully understood by reference to the figures. FIG. 1 shows article 10. Articles 10 includes substrate layer 12, adhesive layer 20 and release liner 30. Substrate layer 12 has first major surface 16 in contact with the adhesive layer 20, and second major surface 14. Adhesive layer 20 has first major surface 24 and second major surface 22 in contact with substrate layer 12. First major surface 24 of adhesive layer 20 is in contact with release liner 30. Release liner 30 has first major surface 34 and second major surface 32 and second major surface 32 is in contact with first major surface 24 of the adhesive layer. Second major surface 32 of release liner 30 includes protrusions 36, where the protrusions 36 form channels 26 in the second major surface 24 of adhesive layer 20. In FIG. 1, protrusions 36 are shown as having a square pyramidal shape, however a wide variety of variety of shapes are suitable as described above. In the embodiment shown in FIG. 1, a release liner with chaotic non-continuous structures is shown. Thus, the pattern of protrusions 36 of release liner 30 are shown as being non-regular, however as described above, regular patterns or protrusions are also suitable.

Figure 2:
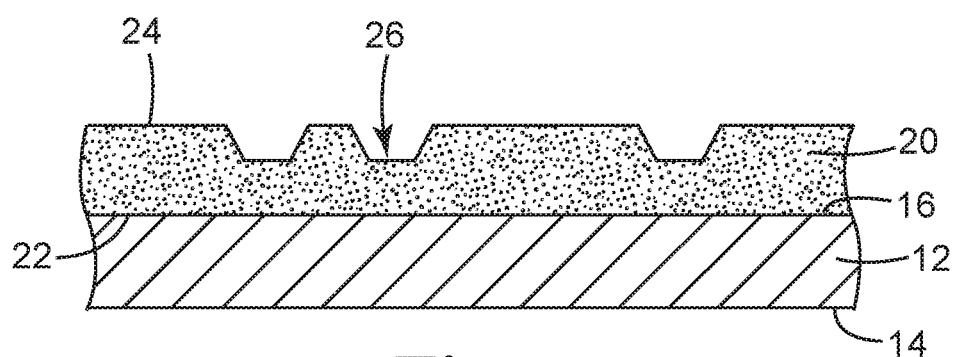
FIG. 2 is a cross sectional view of an embodiment of an article of the present disclosure.

FIG. 2 shows the article of FIG. 1, where release liner 30 has been removed to expose the structured adhesive surface. FIG. 2 shows substrate layer 12 with first major surface 16 in contact with the adhesive layer 20, and second major surface 14. Adhesive layer 20 has second major surface 22 in contact with substrate layer 12. Adhesive layer 20 has first major surface 24 with microchannels 26. As has been described above, adhesive layer 20 is a pressure sensitive adhesive or gel adhesive layer, and microchannels 26 comprise permanent microstructural features, meaning that the microchannels do not spontaneously collapse.

Figure 3:
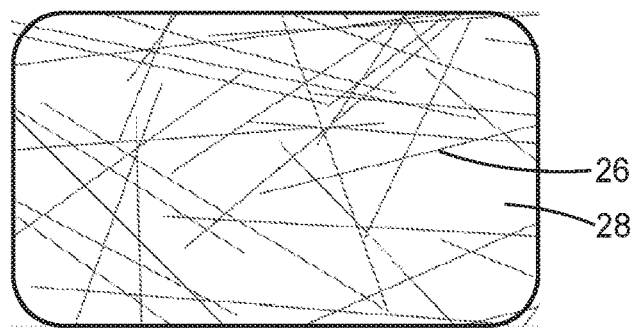
FIG. 3 is a perspective view of another embodiment of an article of the present disclosure.
Figure 4:
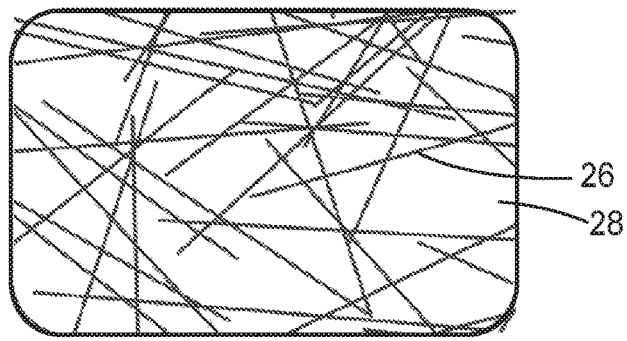
FIG. 4 is a perspective view of another embodiment of an article of the present disclosure.
Figure 5:
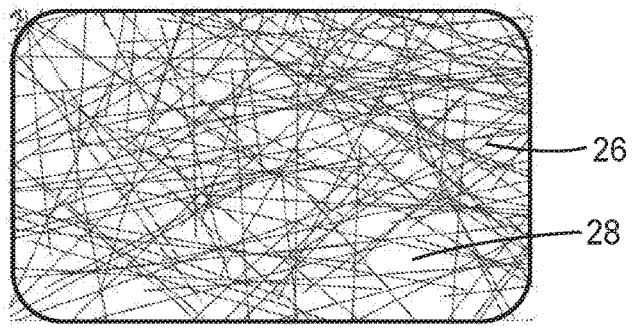
FIG. 5 is a perspective view of another embodiment of an article of the present disclosure.
Figure 6:
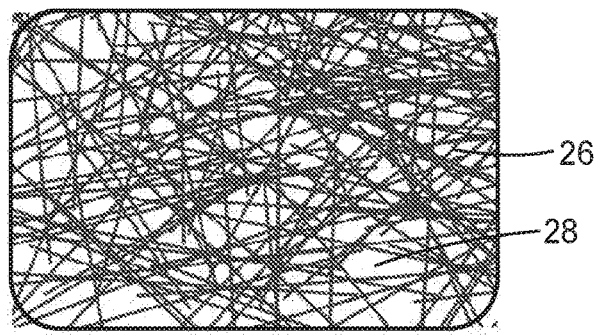
FIG. 6 is a perspective view of another embodiment of an article of the present disclosure.

FIGS. 3-6 show a top side view of articles of FIG. 2, looking down on the exposed adhesive surface. The adhesive surface shows microchannels 26 disposed in non-structured adhesive regions 28. These microstructured surfaces can be described by the ratio of the land area (non-structured adhesive regions 28) to the groove area (microchannels 26). FIG. 3 provides for channels arranged with a ratio of the land/groove area of approximately 82%, while the same configuration with thicker channels is shown in FIG. 4 with a ratio of the land/groove area of approximately 53%. Similarly, the exemplary pattern of channels 26 of FIG. 5 includes a ratio of the land/groove area of approximately 91%, while the same configuration with thicker channels is shown in FIG. 6 with a ratio of the land/groove area of approximately 78%.

Figure 7:
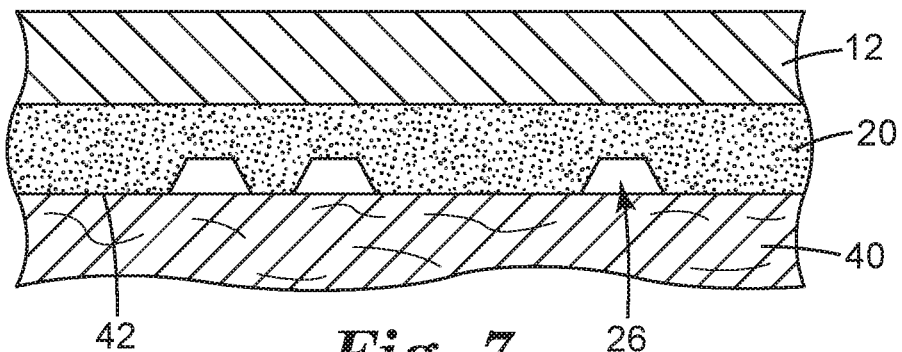
FIG. 7 is a cross sectional view of an embodiment of a construction of the present disclosure.

FIG. 7 shows an adhesive construction of this disclosure. These constructions are prepared by attaching articles such as are shown in FIG. 2 to a substrate, typically the substrate comprising mammalian skin. In FIG. 7, substrate 40 has surface 42 to which an adhesive article comprising adhesive layer 20 and substrate layer 12 is attached. Adhesive layer 20 has microchannels 26 that are permanent features in the adhesive layer.

Figure 8:
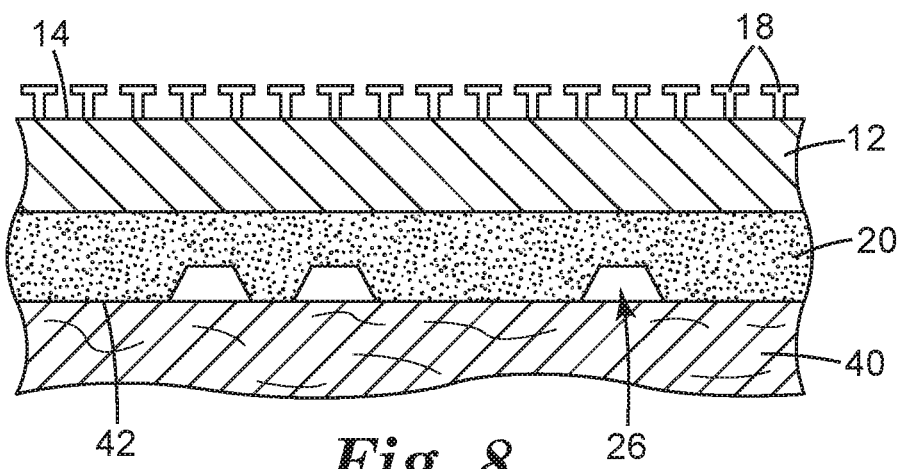
FIG. 8 is cross sectional view of another embodiment of a construction of the present disclosure.

FIG. 8 shows another adhesive construction of this disclosure. In FIG. 8, substrate 40, typically mammalian skin, has surface 42 to which an adhesive article comprising adhesive layer 20 and substrate layer 12 is attached. Adhesive layer 20 has microchannels 26 that are permanent features in the adhesive layer. Substrate 12 has surface 14 with protrusions 18.

Figure 9:
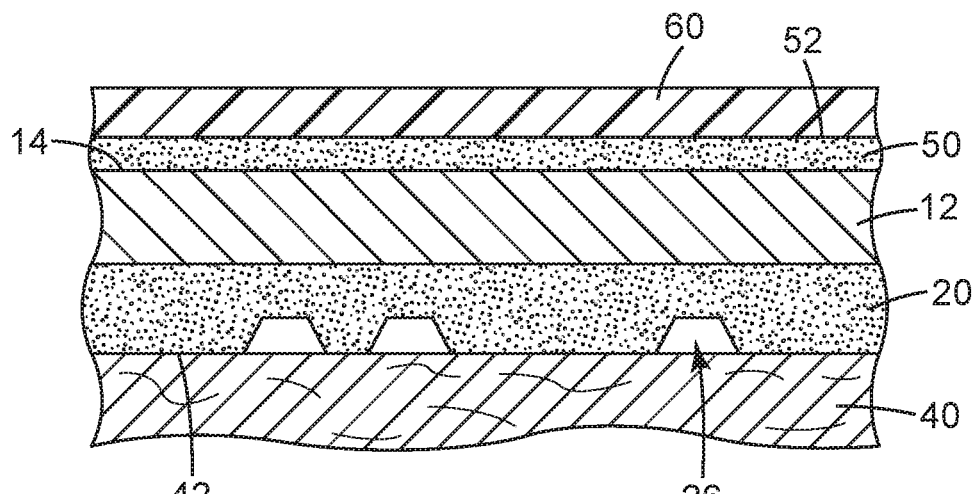
FIG. 9 is cross sectional view of another embodiment of a construction of the present disclosure.

FIG. 9 shows another adhesive construction of this disclosure. In FIG. 9, substrate 40, typically mammalian skin, has surface 42 to which an adhesive article comprising adhesive layer 20 and substrate layer 12 is attached. Adhesive layer 20 has microchannels 26 that are permanent features in the adhesive layer. Substrate 12 has surface 14 on which is disposed adhesive layer 50. Release liner 60 is attached to surface 52 of adhesive layer 50.

Figure 10:
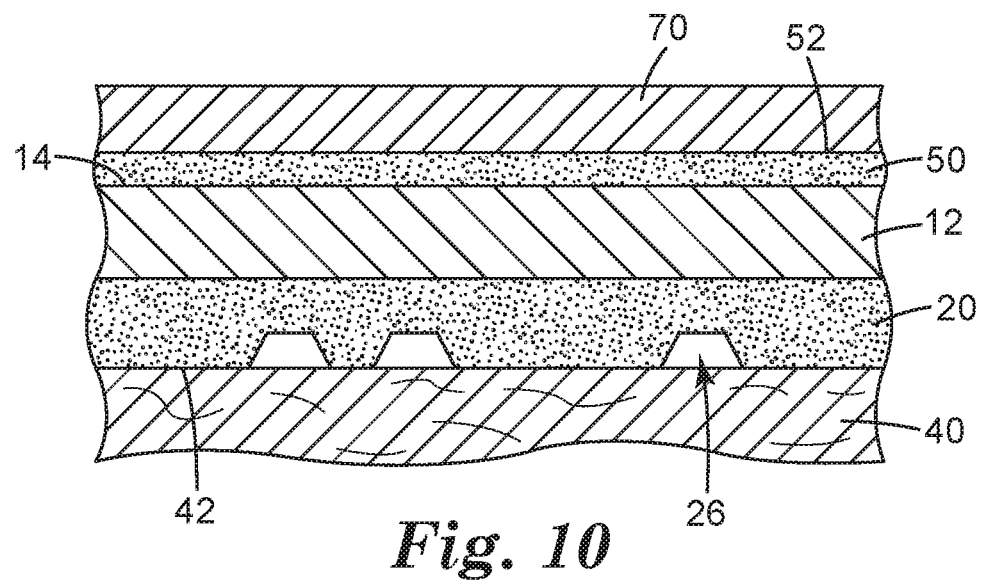
FIG. 10 is cross sectional view of another embodiment of a construction of the present disclosure.

FIG. 10 shows another adhesive construction of this disclosure. In FIG. 10, substrate 40, typically mammalian skin, has surface 42 to which an adhesive article comprising adhesive layer 20 and substrate layer 12 is attached. Adhesive layer 20 has microchannels 26 that are permanent features in the adhesive layer. Substrate 12 has surface 14 on which is disposed adhesive layer 50. Article 70 is attached to adhesive layer 50 at surface 52. Article 70 can be any of the articles described above such as a substrate, a sensor, tubing, and the like.

This disclosure includes the following embodiments. Among the embodiments are methods of providing fluid transport from an adhesive article attached to mammalian skin. Embodiment 1 includes a method of providing fluid transport from an adhesive article attached to mammalian skin comprising: providing an adhesive article comprising: a substrate with a first major surface and a second major surface; and an adhesive layer with a first major surface and a second major surface, wherein the second major surface of the adhesive layer is in contact with the first major surface of the substrate, and wherein the first major surface of the adhesive layer comprises a microstructured surface comprising channels, with at least one channel that extends to at least one boundary of the adhesive layer, wherein the adhesive layer comprises a pressure sensitive adhesive or a gel adhesive and wherein the microstructured surface comprises a permanently microstructured surface; attaching the microstructured surface of the adhesive article to mammalian skin, wherein the channels of the microstructured surface permits the transport of fluid.

Embodiment 2 is the method of embodiment 1, wherein the adhesive comprises a (meth)acrylate pressure sensitive adhesive, a siloxane-based pressure sensitive adhesive, or a block copolymer pressure sensitive adhesive.

Embodiment 3 is the method of embodiment 2, wherein the block copolymer comprises a polyurethane block copolymer, a polyurea block copolymer, or a hydrocarbon-based block copolymer.

Embodiment 4 is the method of any of embodiments 1-3, wherein the adhesive is a crosslinked pressure sensitive adhesive or gel adhesive.

Embodiment 5 is the method of any of embodiments 1-4, wherein the substrate comprises a polymeric film, a fabric, a non-woven, a foam, a paper, a mesh, a release liner, or a device.

Embodiment 6 is the method of embodiment 5, wherein the substrate comprises a polymeric film substrate comprising polyester, polyurethane, polyolefin, poly(meth)acrylate, or combinations thereof.

Embodiment 7 is the method of any of embodiments 1-6, wherein the fluid comprises an aqueous fluid or vapor.

Embodiment 8 is the method of any of embodiments 1-7, wherein the fluid comprises a biological fluid.

Embodiment 9 is the method of embodiment 8, wherein the biological fluid comprises blood, sweat, or wound exudate.

Embodiment 10 is the method of any of embodiments 1-9, wherein fluid transport is assisted fluid transport.

Embodiment 11 is the method of embodiment 10, where fluid transport is assisted by the application of a vacuum or by the use of wicking material layer.

Embodiment 12 is the method of any of embodiments 1-11, wherein the pressure sensitive adhesive further comprises an additive selected from tackifiers, plasticizers, fillers, antimicrobials, or combinations thereof.

Embodiment 13 is the method of any of embodiments 1-12, wherein the permanently microstructured surface comprises an irregular array of channels.

Also disclosed are adhesive constructions. Embodiment 14 is an adhesive construction comprising: a surface comprising mammalian skin; and an adhesive article in contact with the surface comprising mammalian skin, the adhesive article comprising: a substrate with a first major surface and a second major surface; and an adhesive layer with a first major surface and a second major surface, wherein the second major surface of the adhesive layer is in contact with the first major surface of the substrate, and wherein the first major surface of the adhesive layer comprises a microstructured surface comprising channels, with at least one channel that extends to at least one boundary of the adhesive layer, wherein the microstructured surface comprises a permanently microstructured surface, such that the channels in the surface of the adhesive layer permit transport of fluid.

Embodiment 15 is the adhesive construction of embodiment 14, wherein the adhesive comprises a (meth)acrylate pressure sensitive adhesive, a siloxane-based pressure sensitive adhesive, or a block copolymer pressure sensitive adhesive.

Embodiment 16 is the adhesive construction of embodiment 15, wherein the block copolymer comprises a polyurethane block copolymer, a polyurea block copolymer, or a hydrocarbon-based block copolymer.

Embodiment 17 is the adhesive construction of any of embodiments 14-16, wherein the adhesive comprises a crosslinked pressure sensitive adhesive or a gel adhesive.

Embodiment 18 is the adhesive construction of any of embodiment 14-17, wherein the substrate comprises a polymeric film, a fabric, a non-woven, a foam, a paper, a mesh, a release liner, or a device.

Embodiment 19 is the adhesive construction of embodiment 18, wherein the substrate comprises a polymeric film substrate comprising polyester, polyurethane, polyolefin, poly(meth)acrylate, or combinations thereof Embodiment 20 is the adhesive construction of any of embodiments 14-19, wherein the second major surface of the substrate comprises a microstructured surface comprising protrusions.

Embodiment 21 is the adhesive construction of any of embodiments 14-20, wherein the fluid comprises an aqueous fluid or vapor.

Embodiment 22 is the adhesive construction of any of embodiments 14-21, wherein the fluid comprises a biological fluid.

Embodiment 23 is the adhesive construction of embodiment 22, wherein the biological fluid comprises blood, sweat, or wound exudate.

Embodiment 24 is the adhesive construction of any of embodiments 14-23, wherein the pressure sensitive adhesive further comprises an additive selected from tackifiers, plasticizers, fillers, antimicrobials, or combinations thereof.

Embodiment 25 is the adhesive construction of any of embodiments 14-24, wherein the permanently microstructured surface comprises an irregular array of channels.

Also disclosed are multi-layer adhesive articles. Embodiment 26 is a multi-layer adhesive article comprising: a release liner comprising at least one structured release surface; an adhesive layer with a first major surface and a second major surface, wherein the first major surface of the adhesive layer is in contact with the at least one structured release surface of the release liner, and a substrate with a first major surface and a second major surface, wherein the second major surface of the adhesive layer is in contact with the first major surface of the substrate, wherein the substrate comprises a device, a sensor or a multi-layer substrate, and wherein the first major surface of the adhesive layer comprises a microstructured surface comprising channels, with at least one channel that extends to at least one boundary of the adhesive layer, wherein the microstructured surface comprises a permanently microstructured surface, such that the channels in the surface of the adhesive layer permit transport of fluid.

Embodiment 27 is the multi-layer adhesive article of embodiment 26, wherein the adhesive comprises a (meth) acrylate pressure sensitive adhesive, a siloxane-based pressure sensitive adhesive, or a block copolymer pressure sensitive adhesive, wherein the block copolymer is selected from a polyurethane block copolymer, a polyurea block copolymer, or a hydrocarbon-based block copolymer.

Embodiment 28 is the multi-layer adhesive article of any of embodiments 26-27, wherein the adhesive comprises a crosslinked pressure sensitive adhesive or a gel adhesive.

Embodiment 29 is the multi-layer adhesive article of any of embodiments 26-28, wherein the multi-layer substrate comprises an article comprising: a polymeric film layer, a fabric layer, a non-woven layer, a foam layer, a paper layer, or a mesh layer; an adhesive layer in contact with the polymeric film layer, the fabric layer, the non-woven layer, the foam layer, the paper layer, or the mesh layer; and a release liner in contact with adhesive layer.

Embodiment 30 is the multi-layer adhesive article of any of embodiments 26-29, wherein the adhesive further comprises an additive selected from tackifiers, plasticizers, fillers, antimicrobials, or combinations thereof.

Embodiment 31 is the multi-layer adhesive article of any of embodiments 26-30, wherein the permanently microstructured surface comprises an irregular array of channels.

EXAMPLES

Objects and advantages of this disclosure are further illustrated by the following examples, but the particular materials and amounts thereof recited in these examples, as well as other conditions and details, should not be construed to unduly limit this disclosure. These examples are merely for illustrative purposes and are not meant to limit the scope of the claims. All parts, percentages, ratios, etc. in the examples and the rest of the specification are by weight, unless noted otherwise. Solvents and other reagents used were obtained from Sigma-Aldrich Chemical Company, St. Louis, Missouri unless otherwise noted.

Materials

| Reference | Description and Supplier |
|---|---|
| T1 | TEGADERM, 3M Company, St. Paul, MN |
| G1 | G32801-5 White vinyl Graphic Film, 3M Company, St. Paul, MN |
| F1 | A cast, opaque, white polyethylene film with a thickness of 51 micrometers |
| IOA | Isooctyl acrylate |
| AA | Acrylic acid |
| Si-Mac | Silicone macromer, prepared as described in the Preparative Examples section below |
| ABP | Copolymerizable photoinitiator of 4-acryloxy benzophenone, prepared according to US Patent No. 4,737,559 (Kellen et al.). |
| IOTG | Chain Transfer agent, isooctylthioglycolate, commercially available from Dow Chemical, Midland, MI. |
| Initiator-1 | Thermal free radical initiator, commercially available from duPont, Wilmington, DE as "VAZO 52". |

Methods

Skin Moisture Measurement

Skin moisture measurements were made using a 'New Spa' Brand Skin Moisture Analyzer SK-III, (Southeast Aesthetic LTD, Co., Tallahassee, FL). Skin was first patted dry with a tissue and then allowed to dry further for one minute before taking the first measurement. This allowed surface moisture to evaporate, which could affect the impedance measurement.

Five measurements were taken over the course of 30 seconds in different locations on the skin area where the sample had been applied. Measurements were taken by pressing the electrode on the end of the skin moisture analyzer against the skin. The spring-loaded construction of the device's sensor ensured consistent pressure was applied for each reading. Skin near where the samples had been applied was used as control for the impedance measurements.

180° Peel Adhesion Strength

Peel adhesion strength was measured in the following manner, which generally followed the procedure described in ASTM D 3330-90. Peel adhesion strength was measured at 72° F. (22° C.) and 50% relative humidity (RH) using a Zwick model Z005 tensile tester (Zwick USA, Kennesaw, GA). A tape test specimen measuring 1 inch (2.54 centimeters) wide by approximately 5 inches (12.7 centimeters) long was applied to a pre-cleaned, flat, rigid substrate (either stainless steel (SS), polypropylene (PP), polyethylene (PE), or polyvinyl chloride (PVC)). Substrates were cleaned by wiping once with a solvent (either methyl ethyl ketone or heptane) and a clean lint free tissue, then allowed to air dry prior to use. SS substrates were 0.052 inches (1.31 millimeters) thick, PP and PE substrates were 0.188 inches (4.76 millimeters) thick, and PVC substrates were 0.0625 inches (1.59 millimeters) thick. To apply the tape specimen to the substrate, a mechanical roller machine or hand operated 4.5 pound (ca. 2 kilogram) hard rubber roller was used to ensure intimate contact with the substrate surface. The hand operated roller was used at a rate of approximately 2 inches (50 millimeters)/second with no additional force. A setting of 120 inches/minute (305 cm/min) was used with the mechanical roller machine. The test specimen was either tested immediately after preparation (i.e., an immediate dwell time, reported as "Instant Peel" or T0) or was equilibrated (dwelled) for the reported hours, such as 24 or 72 hours at 72° F. (22° C.) and 50% relative humidity prior to testing (reported as T24 Peel or T72 Peel, respectively). The free end of the tape test specimen was attached to the load cell apparatus and the specimen was oriented to provide a peel angle of 180°. The substrate was attached to the moveable platen on the instrument. The peel adhesion test was run at a constant rate of 12 inches (30.48 centimeters)/minute and the average peel adhesion force was recorded in ounces/inch. The results of five measurements were averaged to provide the reported values.

Preparation of Adhesive

Preparation of SiMac

A methacrylate-terminated polydimethylsiloxane macromer (SiMac) was prepared as described in U.S. Pat. No. 4,693,935 (Mazurek) "Monomer C3b". A flame-dried 1-liter three-necked flask equipped with a mechanical stirrer, condenser, and septum and purged with dry argon was charged with a dilute solution of D3 (1 gram) in heptane (100 milliliters), both freshly dried. 5.5 milliliters of BuLi solution (1.7 M in hexane, 9.35 mmoles) was introduced and the initiation reaction was continued overnight at room temperature. 198.7 grams (0.89 mole) of D3 in THF (496.8 g) was added to the reaction flask via polytetrafluoroethylene (PTFE) tubing and the polymerization was continued for 8 hours with the reaction mixture maintained at room temperature. Progress of the reaction was monitored by GC analysis of the reaction mixture. The capping agent, 3-methacryloxypropyldimethylchlorosilane (2.26 g, 10.3 mmoles) was then introduced and the reaction mixture was stirred for 1 hour, while additionally agitated with an ultrasonic bath which raised the temperature to about 40° C. The resultant polymer solution was poured into an excess of methanol with vigorous stirring. The separated polymer fraction was dissolved in ethyl ether and washed with water. The organic layer was dried with magnesium sulfate, filtered, and evaporated. The resultant polymer did not contain detectable quantities of low molecular weight materials, such as oligomeric siloxanes.

Polymerization

The adhesive was prepared using the method provided for Examples 1-4 in US Patent Publication No. 2011/0300296. Polymerization was carried out by a two-step reaction within a VSP2 adiabatic reaction apparatus equipped with a 316 stainless steel test can (available from Fauske and Associates Inc, Burr Ridge Ill.). In the VSP2 reaction vessel was placed IOA, AA, the SiMac macromonomer prepared above, and ABP in the amounts shown in Table 1. The polymerization mixture also included Initiator-1, and IOTG and the polymerization was carried out as described in Examples 1-4 of US Patent Publication No. 2011/0300296.

TABLE 1

| Reagents used in adhesive (parts by weight). | | | | |
| --- | --- | --- | --- | --- |
| | IOA | AA | SiMac | ABP |
| Adhesive composition | 85.5 | 7.0 | 7.5 | 0.3125 |

The reaction mixture was removed from the reactor and dissolved in THF (tetrahydrofuran) at approximately 30% solids. The polymeric reaction product yielded a clear solid PSA that was cold flowing until it was crosslinked.

Preparation of Film with Grooved Adhesive

A microstructured liner was hot melt coated with the adhesive described above via the contact die coating station at an adhesive thickness of 50 micrometers. The adhesive layer was subsequently UV cured with UV dose of 52-55 mJ/cm$^2$, and then laminated to the G1 film using a winder.

Example 1

Test samples measuring about 3.8 cm×6.6 cm (1.5 inches×3 inches) were cut from four types of adhesive-coated film. The first film (T1) was commercially available TEGADERM.

The second and third film samples were both cut from the G1 film coated with microstructured adhesive prepared above, one film having grooved adhesive channels running parallel to the long axis of the film, and the other having grooved adhesive channels running perpendicular to the long axis of the film. The grooved adhesive channels were similar to those shown generally in FIGS. 1 and 2, and the specific microstructure pattern was 75 lpi linear, 80° side-wall, 28 micrometers deep, 85% land. All test samples were applied in close proximity to each other on the right shin of a human test subject. Moisture measurements were taken two hours after a 5-mile (8.06 kilometers) run on a treadmill. The test samples were removed immediately before the skin moisture measurements were taken according to the procedure provided in Skin Moisture Measurements. The results are reported in Table 2.

TABLE 2

| Skin Moisture Measurements. | | | | |
| --- | --- | --- | --- | --- |
| | Control Skin | TEGADERM Dressing | G1 Vinyl with adhesive grooves parallel to long axis | G1 Vinyl with adhesive grooves perpendicular to long axis |
| | 20.1 | 33.7 | 33.2 | 33.1 |
| | 20.1 | 37.7 | 33.2 | 33.4 |
| | 18.7 | 37.1 | 35.4 | 32.4 |
| | 19.6 | 37.1 | 30.4 | 31.4 |
| | 20.8 | 37.3 | 32.1 | 32.4 |
| Average | 19.9 | 36.6 | 32.9 | 32.5 |

The skin covered by the G1 vinyl films with microstructured adhesive was dryer than the skin covered by the TEGADERM sample.

Example 2

Additional adhesive-coated films having microstructured patterns in the adhesive were prepared according to methods described in U.S. Patent Application No. 62/652,567, filed 4 Apr. 2018, Kallman, et al., "Chaotic Non-Continuous Structures Useful for Functional Adhesive Systems" in Example 1 (plano-area to total surface area ratio of 85%), Example 2 (plano-area to total surface area ratio of 75%), and Example 4 (plano-area to total surface area ratio of 55%). An additional film was prepared based on the method of Example 1, having plano-area to total surface area ratio of 65%. The adhesive was as described above in Preparation of Adhesive. The adhesive thickness was 50 micrometers and the film backing was F1.

Peel-test specimens were prepared using each of these films having microstructured adhesive according to the method described in 180° Peel Adhesion Strength. Additional peel-test specimens were prepared using the microstructured adhesive-coated G1 film of Example 1, with the microstructured groove oriented parallel to the direction of the peel test. Peel test-specimens prepared using BLEND-ERM surgical tape (3M Company, St. Paul, MN) were prepared and tested as a comparative. The peel-test specimens were tested according to 180° Peel Adhesion Strength and the peel-test results of all samples are presented in Table 3.

TABLE 3

180° peel adhesion test results at time zero (T0, immediately after preparation), and at 24 hours (hrs) and 72 hours after preparation.

| | Polyethylene | | | Polypropylene | | | Stainless Steel | | | Polyvinyl chloride | | |
|---|---|---|---|---|---|---|---|---|---|---|---|---|
| | T0 | 24 hrs | 72 hrs | T0 | 24 hrs | 72 hrs | T0 | 24 hrs | 72 hrs | T0 | 24 hrs | 72 hrs |
| 55% | 7.6 | 8.5 | 7.9 | 6.2 | 11.0 | 10.4 | 10.0 | 11.3 | 12.1 | 13.0 | 10.8 | 10.5 |
| 65% | 4.7 | 7.6 | 6.1 | 7.6 | 10.9 | 11.4 | 10.1 | 15.1 | 13.7 | 9.6 | 12.6 | 11.6 |
| 75% | 7.9 | 6.9 | 9.4 | 11.9 | 12.6 | 11.8 | 8.5 | 11.4 | 12.9 | 12.7 | 14.2 | 14.1 |
| 85% | 5.9 | 9.7 | 7.6 | 9.0 | 13.7 | 12.5 | 12.6 | 13.3 | 13.7 | 13.0 | 14.4 | 13.0 |
| Example 1 | 9.4 | 6.2 | 9.6 | 10.8 | 13.3 | 11.8 | 6.1 | 13.9 | 13.1 | 14.7 | 14.2 | 13.4 |
| BLENDERM | 5.3 | 14.2 | 17.3 | 10.9 | 12.4 | 8.7 | 10.8 | 21.1 | 17.2 | 17.5 | 22.8 | 26.0 |

What is claimed is:

1. A method of providing fluid transport from an adhesive article attached to mammalian skin comprising:
    providing an adhesive article comprising:
        a substrate with a first major surface and a second major surface;
        an adhesive layer with a first major surface and a second major surface, wherein the second major surface of the adhesive layer is in contact with the first major surface of the substrate, and wherein the first major surface of the adhesive layer comprises a microstructured surface comprising at least one channel that extends to at least one boundary of the adhesive layer, wherein the adhesive layer comprises a pressure sensitive adhesive or a gel adhesive and wherein the microstructured surface comprises a permanently microstructured surface; and
        a release liner comprising at least one structured release surface configured to impart the permanently microstructured surface in the adhesive layer;
    removing the release liner from the permanently microstructured surface of the adhesive layer; and
    attaching the permanently microstructured surface of the adhesive article to mammalian skin, wherein the channels of the microstructured surface permits the transport of fluid.

2. The method of claim 1, wherein the adhesive comprises a (meth)acrylate pressure sensitive adhesive, a siloxane-based pressure sensitive adhesive, or a block copolymer pressure sensitive adhesive.

3. The method of claim 1, wherein the adhesive is a crosslinked pressure sensitive adhesive or gel adhesive.

4. The method of claim 1, wherein the substrate comprises a polymeric film, a fabric, a non-woven, a foam, a paper, a mesh, a release liner, or a device.

5. The method of claim 1, wherein the fluid comprises an aqueous fluid or vapor.

6. The method of claim 1, wherein the fluid comprises a biological fluid.

7. The method of claim 1, wherein fluid transport is assisted fluid transport.

8. The method of claim 1, wherein the permanently microstructured surface comprises an irregular array of channels.

9. The method of claim 1, wherein the pressure sensitive adhesive and the release liner are in contact when the pressure sensitive adhesive is crosslinked.

10. The method of claim 1, wherein the release liner is a microstructured tool configured to emboss the surface of the pressure sensitive adhesive to form the permanently microstructured surface of the pressure sensitive adhesive.

11. The method of claim 1, wherein the substrate has a low moisture vapor transmission rate to inhibit or block fluid flow through the substrate.

12. The method of claim 1, wherein fluid transport is assisted by an application of a vacuum.

13. The method of claim 1, wherein fluid transport is assisted by a use of a wicking material layer.

* * * * *